United States Patent
Yao

(10) Patent No.: US 12,526,828 B2
(45) Date of Patent: Jan. 13, 2026

(54) RESOURCE ALLOCATION METHOD AND SYSTEM, TERMINAL DEVICE, AND NETWORK DEVICE

(71) Applicant: GUANGDONG GENIUS TECHNOLOGY CO., LTD., Dongguan (CN)

(72) Inventor: Sheng Yao, Dongguan (CN)

(73) Assignee: GUANGDONG GENIUS TECHNOLOGY CO., LTD., Dongguan (CN)

( * ) Notice: Subject to any disclaimer, the term of this patent is extended or adjusted under 35 U.S.C. 154(b) by 357 days.

(21) Appl. No.: 18/145,985

(22) Filed: Dec. 23, 2022

(65) Prior Publication Data

US 2023/0129670 A1    Apr. 27, 2023

Related U.S. Application Data

(63) Continuation of application No. PCT/CN2020/140731, filed on Dec. 30, 2020.

(30) Foreign Application Priority Data

Jun. 30, 2020    (CN) .......................... 202010619725.4

(51) Int. Cl.
    *H04W 72/51*       (2023.01)
(52) U.S. Cl.
    CPC .................................. *H04W 72/51* (2023.01)

(58) Field of Classification Search
    CPC ....................................................... H04W 72/51
    USPC ............................................................ 370/329
    See application file for complete search history.

(56) References Cited

U.S. PATENT DOCUMENTS

| 2013/0294363 A1 | 11/2013 | Feng et al. |
| 2015/0296499 A1 | 10/2015 | Huang et al. |
| 2020/0137721 A1 | 4/2020 | Chen et al. |

FOREIGN PATENT DOCUMENTS

| CN | 110475312 A | 11/2019 |
| CN | 110495193 A | 11/2019 |
| CN | 111885721 A | 11/2020 |
| EP | 4175379 A1 | 5/2023 |
| WO | 2020071878 A1 | 4/2020 |

OTHER PUBLICATIONS

Extended European Search Report issued in counterpart European Patent Application No. 20942515.6, dated May 10, 2024.

(Continued)

*Primary Examiner* — Angel T Brockman
(74) *Attorney, Agent, or Firm* — Westbridge IP LLC

(57) ABSTRACT

Disclosed are a resource allocation method and a system, a terminal device, and a network device. The method includes: sending a message carrying a terminal type of a terminal device to a network device; and receiving resource allocation information of the terminal device, sent by the network device, the resource allocation information being obtained by the network device according to the terminal type. The terminal device can actively report the terminal type to the network device, such that the network device can perform rational resource allocation on the terminal device according to the terminal type, thereby reducing the waste of network resources and improving the rationality of terminal services.

11 Claims, 5 Drawing Sheets

(56) References Cited

OTHER PUBLICATIONS

Qualcomm Incorporated, Discussion on Considerations for Standardization Framework and Design Principles of RedCap Devices, R1-2004496, 3GPP TSG-RAN WG1 Meeting #101, dated May 25, 2020.
First Office Action issued in counterpart Chinese Patent Application No. 202010619725.4, dated Sep. 20, 2022.
International Search Report and Written Opinion issued in corresponding PCT Application No. PCT/CN2020/140731, dated Mar. 15, 2021.
Second Office Action issued in counterpart Chinese Patent Application No. 202010619725.4, dated Apr. 20, 2023.
Search Report and Written Opinion issued in counterpart Singapore Patent Application 11202261681R, dated Sep. 13, 2005.

RESOURCE ALLOCATION METHOD AND SYSTEM, TERMINAL DEVICE, AND NETWORK DEVICE

CROSS-REFERENCE TO RELATED APPLICATIONS

This application is a continuation of International Application No. PCT/CN2020/140731, filed on Dec. 30, 2020, which claims priority to Chinese Patent Application No. 202010619725.4, filed on Jun. 30, 2020, the entire disclosures of which are incorporated herein by reference.

TECHNICAL FIELD

The present disclosure relates to the technical field of communications, in particular to a resource allocation method and a system, a terminal device, and a network device.

BACKGROUND

With the development of mobile communication industry and the rapid development from a 2nd generation (2G) mobile communication system and a 3rd generation (3G) mobile communication system to a 4th generation (4G) mobile communication system, a 5th generation (5G) mobile communication system, and even a future mobile communication system, smart phones perform Internet access and download faster and faster. It is stipulated in a 4G communication protocol that a 4G phone needs at least two receiving antennas, and a network device rationally configures parameters (such as multiple input multiple output (MIMO) parameters) and allocates corresponding resources to it according to characteristics of 4G and the number of its antennas. It is stipulated in a 5G communication protocol that a 5G phone needs at least four receiving antennas, and the network device also rationally configures the parameters (such as the MIMO parameters) and allocates corresponding resources to it according to characteristics of 5G and the number of its antennas. However, for some smart wearable devices (such as wears and wristbands) or industrial sensors with low-rate requirements, the rate requirements are not high, such that two receiving antennas or even one receiving antenna can meet their rate requirements, and even if four antennas are arranged, configuration is not needed. Therefore, for these smart wearable devices with low-rate requirements, if higher rate is configured, it may only cause waste of resources.

SUMMARY

Embodiments of the present disclosure disclose a resource allocation method and a system, a terminal device, and a network device. The resource allocation method and a system are configured for solving the problem of resource waste of an existing terminal device to realize the rationality of terminal services.

A first aspect of the embodiment of the present disclosure discloses a resource allocation method, which may include:
   sending a message carrying a terminal type of a terminal device to a network device; and
   receiving resource allocation information of the terminal device, sent by the network device, the resource allocation information being obtained by the network device according to the terminal type.

Optionally, in some embodiments of the present disclosure, content in a cell structure of the terminal type includes bits of a high-end phone, a low-end phone, a high-end wear, a low-end wear, and an industrial sensor, or the content in the cell structure of the terminal type includes bits of a low-rate terminal, a mid-rate terminal, and a high-rate terminal.

Optionally, in some embodiments of the present disclosure, the sending a message carrying a terminal type of a terminal device to a network device includes:
   sending a radio resource control setup request (RRC) message carrying the terminal type of the terminal device to the network device when the terminal device accesses to a network;
   or, sending terminal capability information carrying the terminal type of the terminal device to the network device in a process that the terminal device applies to the network device for network registration;
   or, sending a registration request message carrying the terminal type of the terminal device to the network device in the process that the terminal device applies to the network device for network registration;
   or, sending terminal assistance information (UAI) carrying the terminal type of the terminal device to the network device.

A second aspect of the embodiment of the present disclosure discloses a resource allocation method, which may include:
   receiving a message carrying a terminal type of a terminal device, sent by the terminal device;
   obtaining resource allocation information of the terminal device according to the terminal type; and
   sending the resource allocation information to the terminal device.

Optionally, in some embodiments of the present disclosure, content in a cell structure of the terminal type includes bits of a high-end phone, a low-end phone, a high-end wear, a low-end wear, and an industrial sensor, or the content in the cell structure of the terminal type includes bits of a low-rate terminal, a mid-rate terminal, and a high-rate terminal.

Optionally, in some embodiments of the present disclosure, the receiving a message carrying a terminal type of a terminal device, sent by the terminal device, includes:
   receiving an RRC setup request message carrying the terminal type of the terminal device, sent by the terminal device, when the terminal device accesses to a network;
   or, receiving terminal capability information carrying the terminal type of the terminal device, sent by the network device, in a process that the terminal device applies to the network device for network registration;
   or, receiving a registration request message carrying the terminal type of the terminal device, sent by the network device, in the process that the terminal device applies to the network device for network registration;
   or, receiving terminal assistance information carrying the terminal type of the terminal device, sent by the network device.

Optionally, in some embodiments of the present disclosure, after the receiving a message carrying a terminal type of a terminal device, sent by the terminal device, the method further includes:
   establishing an association relationship between the terminal type and a device identity of the terminal device, and saving the association relationship;

the obtaining resource allocation information of the terminal device according to the terminal type includes:
searching for a target terminal identity corresponding to the terminal type according to the association relationship, and obtaining the resource allocation information of the terminal device corresponding to the target terminal identity according to the terminal type.

A third aspect of the embodiment of the present disclosure discloses a terminal device, which may include:
a sending module configured to send a message carrying a terminal type of a terminal device to a network device; and
a receiving module configured to receive resource allocation information of the terminal device, sent by the network device, the resource allocation information being obtained by the network device according to the terminal type.

Optionally, in some embodiments of the present disclosure, content in a cell structure of the terminal type includes bits of a high-end phone, a low-end phone, a high-end wear, a low-end wear, and an industrial sensor, or the content in the cell structure of the terminal type includes bits of a low-rate terminal, a mid-rate terminal, and a high-rate terminal.

Optionally, in some embodiments of the present disclosure, the sending module is specifically configured to send an RRC setup request message carrying the terminal type of the terminal device to the network device when the terminal device accesses to a network;
or, to send terminal capability information carrying the terminal type of the terminal device to the network device in a process that the terminal device applies to the network device for network registration;
or, to send a registration request message carrying the terminal type of the terminal device to the network device in the process that the terminal device applies to the network device for network registration;
or, to send terminal assistance information carrying the terminal type of the terminal device to the network device.

A fourth aspect of the embodiment of the present disclosure discloses a network device, which may include:
a receiving module configured to receive a message carrying a terminal type of a terminal device, sent by the terminal device; and
a sending module configured to obtain resource allocation information of the terminal device according to the terminal type and to send the resource allocation information to the terminal device.

Optionally, in some embodiments of the present disclosure, content in a cell structure of the terminal type includes bits of a high-end phone, a low-end phone, a high-end wear, a low-end wear, and an industrial sensor, or the content in the cell structure of the terminal type includes bits of a low-rate terminal, a mid-rate terminal, and a high-rate terminal.

Optionally, in some embodiments of the present disclosure, the process that a receiving module is configured to receive a message carrying a terminal type of a terminal device, sent by the terminal device, specifically includes:
receiving an RRC setup request message carrying the terminal type of the terminal device, sent by the terminal device, when the terminal device accesses to a network;
or, receiving terminal capability information carrying the terminal type of the terminal device, sent by the network device, in a process that the terminal device applies to the network device for network registration;
or, receiving a registration request message carrying the terminal type of the terminal device, sent by the network device, in the process that the terminal device applies to the network device for network registration;
or, receiving terminal assistance information carrying the terminal type of the terminal device, sent by the network device.

Optionally, in some embodiments of the present disclosure, the network device further includes:
a saving module configured to establish an association relationship between the terminal type and a device identity of the terminal device and to save the association relationship after the receiving module receives the message carrying the terminal type of the terminal device, sent by the terminal device;
the process that a sending module is configured to obtain resource allocation information of the terminal device according to the terminal type specifically includes:
searching for a target terminal identity corresponding to the terminal type according to the association relationship, and obtaining the resource allocation information of the terminal device corresponding to the target terminal identity according to the terminal type.

A fifth aspect of the embodiment of the present disclosure discloses an electronic device, which may include:
a memory having executable program codes stored thereon; and
a processor coupled to the memory;
where the processor is configured to call the executable program codes stored in the memory to perform the resource allocation method disclosed by the first aspect or the second aspect of the embodiment of the present disclosure.

A sixth aspect of the embodiment of the present disclosure discloses a computer-readable storage medium having a computer program stored thereon, where the computer program causes a computer to perform the resource allocation method disclosed by the first aspect or the second aspect of the embodiment of the present disclosure.

A seventh aspect of the embodiment of the present disclosure discloses a computer program product that, when run on a computer, causes the computer to perform part or all of steps in any one method according to the first aspect or the second aspect.

An eighth aspect of the embodiment of the present disclosure discloses an application publishing platform configured to publish a computer program product that, when run on a computer, causes the computer to perform part or all of steps in any one method according to the first aspect or the second aspect.

Compared with the prior art, the embodiment of the present disclosure has the following beneficial effects:

In the embodiment of the present disclosure, the terminal device sends the message carrying the terminal type to the network device, and the network device obtains the resource allocation information of the terminal device according to the terminal type and then sends the resource allocation information to the terminal device. Therefore, by implementing the embodiment of the present disclosure, the terminal device can actively report the terminal type to the network device, such that the network device can perform rational resource allocation on the terminal device according to the terminal type, thereby reducing the waste of network resources and improving the rationality of terminal services.

BRIEF DESCRIPTION OF THE DRAWINGS

To more clearly describe the technical solutions in the embodiments of the present disclosure, the accompanying drawings that need to be used in the embodiments may be briefly introduced below. Apparently, the accompanying drawings in the description below only illustrate some embodiments of the present disclosure. Those of ordinary skill in the art may also derive other accompanying drawings from these accompanying drawings without creative efforts.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only part rather than all of the embodiments of the present disclosure. All other embodiments obtained by those skilled in the art on the basis of the embodiments in the present disclosure without creative efforts shall fall within the scope of protection of the present disclosure.

It should be noted that the terms "include/comprise", "have/has" and any variants thereof in the embodiments of the present disclosure are intended to cover non-exclusive inclusions. For example, processes, methods, systems, products, or devices that include a series of steps or units need not be limited to those steps or units that are clearly listed, but may include other steps or units that are not clearly listed or are inherent to these processes, methods, products, or devices.

Figure 1:
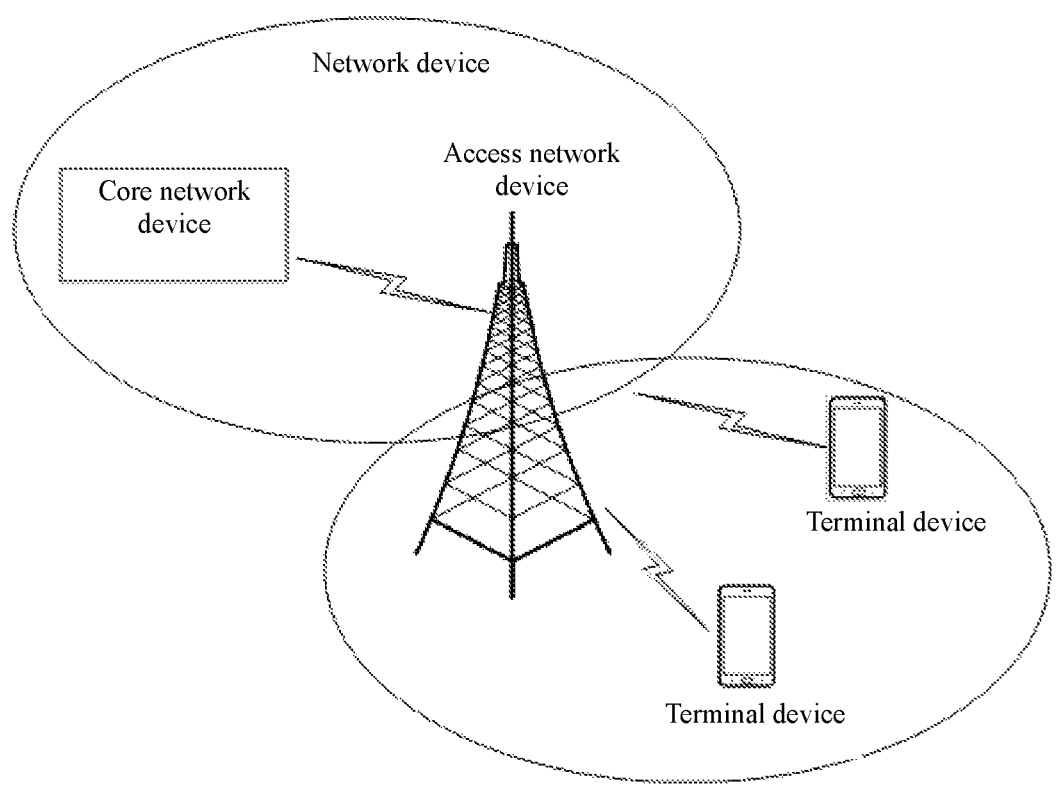
FIG. 1 is an architecture diagram of a system applied in an embodiment of the present disclosure.

As shown in FIG. 1, it is an architecture diagram of a system applied in an embodiment of the present disclosure. An architecture of the system may include a network device and a terminal device. The network device may further include an access network device and a core network device. The radio communication system further includes a plurality of core networks configured for communication with the access network device. The access network device may be an evolutional node B (eNB or e-NodeB for short) that is a macro node B, a micro node B (also referred to as "small node B"), a micro-micro node B, an access point (AP), a transmission point (TP), or a new generation node B (gNodeB) in a long-term evolution (LTE) system, a next radio (NR) system, or an authorized auxiliary access long-term evolution (LAA-LTE) system.

The terminal device in the embodiment of the present disclosure may be referred to as user equipment (UE). The terminal device may be a device such as a personal communication service (PCS) telephone, a cordless telephone, a session initiation protocol (SIP) telephone, a wireless local loop (WLL) station, or a personal digital assistant (PDA). The terminal device may also be a mobile phone, a mobile station (MS), a mobile terminal, or a laptop. The terminal device may communicate with one or more core networks via a radio access network (RAN). For example, the terminal device may be the mobile phone (or referred to as a "cellular" phone) or a computer with the mobile terminal. For example, the terminal device may also be a portable, pocket, handheld, computer built-in or vehicle-mounted mobile device that exchanges voice and/or data with the radio access network. The terminal device may also be a handheld device with a radio communication function, a computing device or other processing devices connected to a radio modem, a vehicle-mounted device, a wearable device, a terminal device in a future 5G network, or a terminal device in a future evolution network. The above is just an example, which is not limited thereto in practical application.

A universal mobile telecommunication system (UMTS) is one of third generation mobile telecommunication systems in an international mobile telecommunications-2000 (IMT-2000) framework developed by the international telecommunication union (ITU). A protocol stack of the UMTS is divided into a non-access stratum (NAS) and an access stratum (AS). The NAS is configured for processing transmission of information between the user equipment (UE) and the core networks. The transmitted content may be user information or control information. A radio resource control (RRC) layer and a protocol layer below it are referred to as the AS, while the RRC layer is a third layer of a control plane between the UE and the Node-B, a first layer is a physical Layer, and a second layer is a medium access control (MAC) layer.

An international mobile subscriber identification number (IMSI) is a mark for distinguishing mobile subscribers. It is stored in a subscriber identity module (SIM) card and may be configured for distinguishing valid information of the mobile subscribers.

A temporary mobile subscriber identity (TMSI) is configured for temporarily replacing the IMSI to perform transmission in the network to strengthen the confidentiality of the system and prevent illegal individuals or groups from stealing the IMSI or tracking the user's location by monitoring signaling on a radio path.

An international mobile equipment identity (IMEI), commonly referred to as a mobile phone "serial number", is configured for recognizing each independent mobile phone and other mobile communication devices in a mobile phone network, and is equivalent to an identity card of the mobile phone.

Embodiments of the present disclosure provide a resource allocation method and a system, a terminal device, and a network device. The resource allocation method and a system are configured for performing rational resource allocation to reduce the waste of network resources and improve the rationality of terminal services. The technical solution of the present disclosure will be described in detail below with reference to the specific embodiments.

Figure 2:
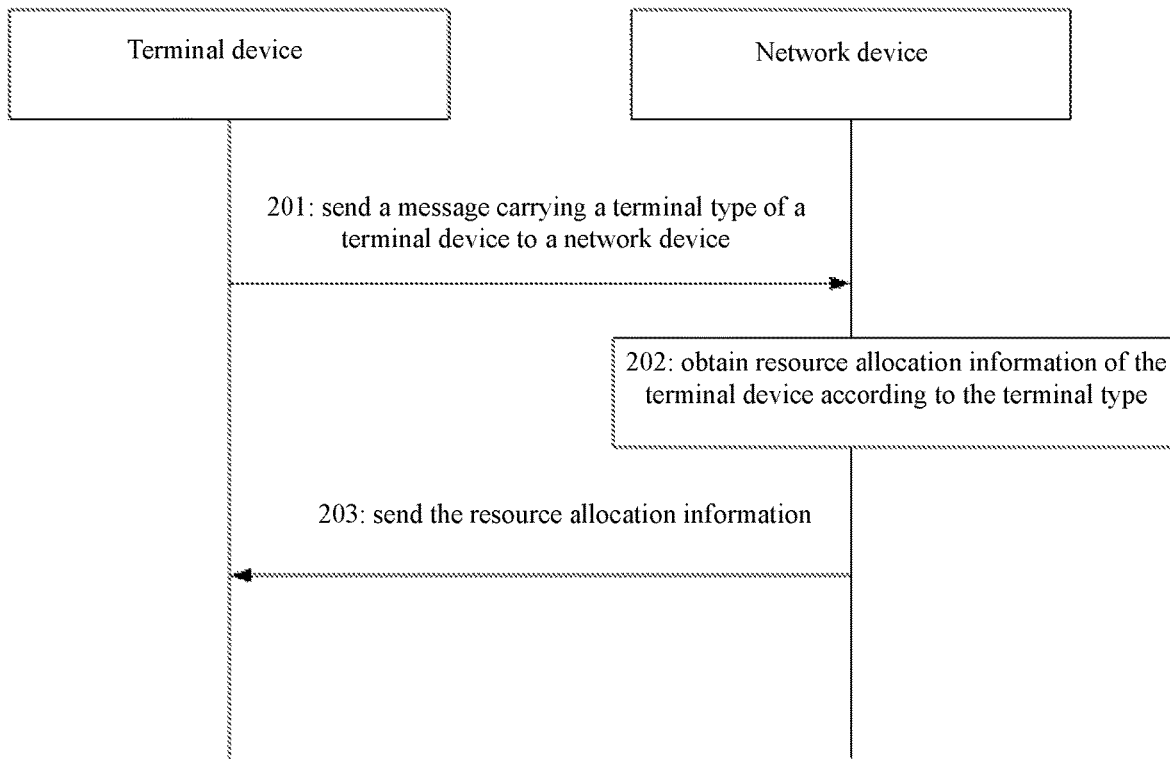
FIG. 2 is a signaling diagram of a resource allocation method disclosed by a first embodiment of the present disclosure.

Referring to FIG. 2, it is a signaling diagram of a resource allocation method disclosed by a first embodiment of the present disclosure. As shown in FIG. 2, a resource allocation method may include:

201: sending, by a terminal device, a message carrying a terminal type of a terminal device to a network device.

Correspondingly, the network device receives the message carrying the terminal type of the terminal device.

Optionally, the message carrying the terminal type (Ue-type, hereinafter collectively referred to as the terminal type) of the terminal device refers to that the terminal type is encapsulated into the message, where the terminal type is encapsulated in the message by means of a cell structure. Payload content in the cell structure of the terminal type at least includes bits of a high-end phone, a low-end phone, a high-end wear, a low-end wear, and an industrial sensor, or the payload content in the cell structure of the above terminal type at least includes bits of a low-rate terminal (low-rate-ue), a mid-rate terminal (mid-rate-ue), and a high-rate terminal (high-rate-ue). The bits of the high-end phone may be filled with parameters to indicate whether the terminal device is the high-end phone, the bits of the low-end phone may be filled with parameters to indicate whether the terminal device is the low-end phone, the bits of the high-end wear may be filled with parameters to indicate whether the terminal device is the high-end wear, the bits of the low-end wear may be filled with parameters to indicate whether the terminal device is the low-end wear, and the bits of the industrial sensor may be filled with parameters to indicate whether the terminal device is the industrial sensor. Alternatively, the bits of the low-rate terminal (low-rate-ue) may be filled with parameters to indicate whether the terminal device is the low-rate terminal, the bits of the mid-rate terminal (mid-rate-ue) may be filled with parameters to indicate whether the terminal device is the mid-rate terminal, and the bits of the high-rate terminal (high-rate-ue) may be filled with parameters to indicate whether the terminal device is the high-rate terminal.

A definition of the terminal type (Ue-type) is as follows:
Ue-type ENUMERATED {high-end-phone, low-end-phone, high-end-wear, low-end-wear, industrial sensor, spare}
or
Ue-type ENUMERATED {high-rate-ue, mid-rate-ue, low-rate-ue, spare}

202: obtaining, by the network device, resource allocation information of the terminal device according to the terminal type.

Optionally, the resource allocation information may at least include antenna setting parameters (such as an antenna quantity and emission power) and network resource instructions (such as network bandwidth).

For example, the network device performs resource allocation according to the terminal type. If the terminal device is the low-rate terminal, the resource allocation information includes a network bandwidth of 8 kbs. If the terminal device is the high-rate terminal, the resource allocation information includes a network bandwidth of 20 kbs.

203: sending, by the network device, the resource allocation information to the terminal device.

Correspondingly, the terminal device receives the resource allocation information.

After receiving the resource allocation information, the terminal device performs network resource allocation according to the resource allocation information. The network resources can be rationally allocated according to the terminal type, thereby avoiding the waste of network resources and improving the rationality of terminal services.

By implementing the above embodiment, the terminal device sends the message carrying the terminal type to the network device, and the network device obtains the resource allocation information of the terminal device according to the terminal type and then sends the resource allocation information to the terminal device. Therefore, by implementing the embodiment of the present disclosure, the terminal device can actively report the terminal type to the network device, such that the network device can perform rational resource allocation on the terminal device according to the terminal type, thereby reducing the waste of network resources and improving the rationality of terminal services.

Figure 3:
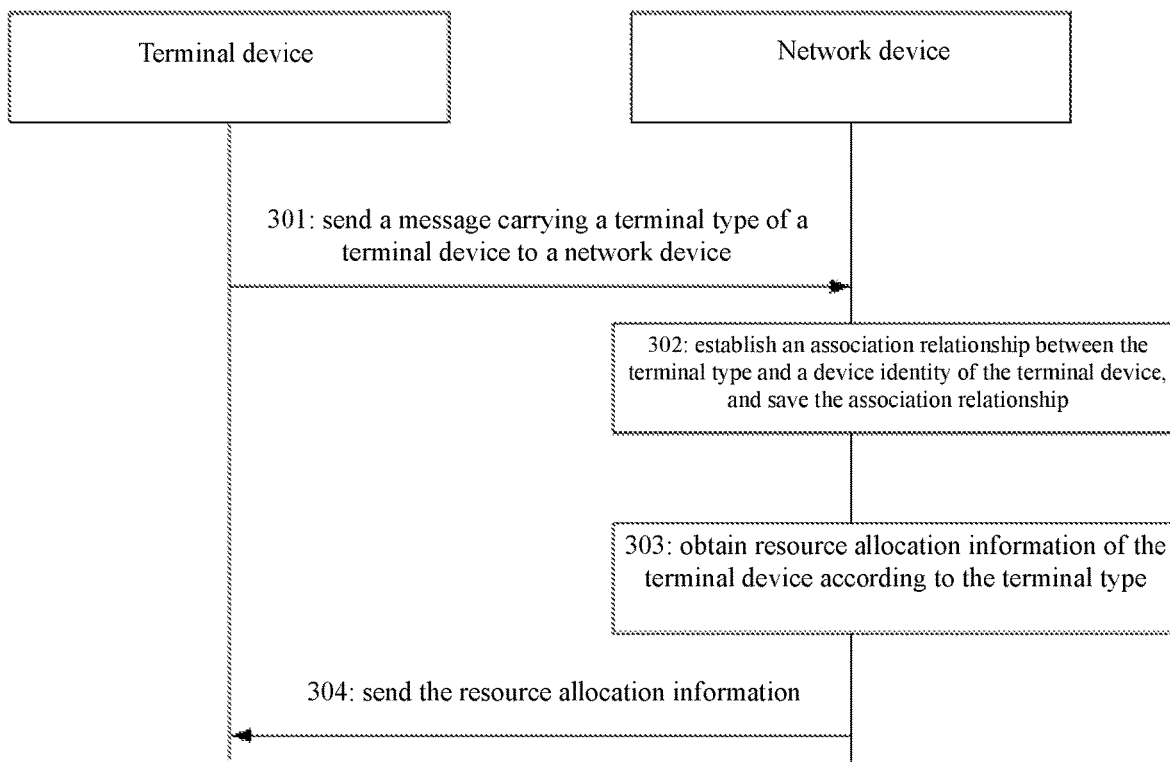
FIG. 3 is a signaling diagram of a resource allocation method disclosed by a second embodiment of the present disclosure.

Referring to FIG. 3, it is a signaling diagram of a resource allocation method disclosed by a second embodiment of the present disclosure. As shown in FIG. 3, the resource allocation method may include:

301: sending, by a terminal device, a message carrying a terminal type of a terminal device to a network device.

Correspondingly, the network device receives the message carrying the terminal type of the terminal device.

302: establishing, by the network device, an association relationship between the terminal type and a device identity of the terminal device, and saving the association relationship.

It may be understood that the device identity (ue-id) of the terminal device may be carried in the above message, so after receiving the above message, the network device extracts the terminal type and the device identity of the terminal device from the message, establishes the association relationship between the terminal type and the device identity, and then saves the association relationship; alternatively, the device identity of the terminal device is in other messages and is sent to the network device, that is to say, the network device may obtain the device identity of the terminal device via other messages or from other channels, then establish the association relationship between the acquired device identity of the terminal device and the terminal type in the above message, and save the association relationship.

Optionally, the device identity (ue-id) of the terminal device may be the the TMSI, or the IMEI.

303: obtaining, by the network device, resource allocation information of the terminal device according to the terminal type.

Optionally, in some embodiments of the present disclosure, the obtaining, by the network device, resource allocation information of the terminal device according to the terminal type includes:

when the network device performs resource allocation on the terminal device, finding, by the network device, the terminal type of the terminal device according to the device identity of the terminal device and the association relationship between the terminal type and the device identity, and then obtaining the resource allocation information of the terminal device according to the terminal type.

By this embodiment, on the basis of the established association relationship, the terminal type of the terminal device can be quickly found. The resource allocation is rationally performed on the terminal device according to the terminal type, thereby improving the rationality of terminal services.

304: sending, by the network device, the resource allocation information to the terminal device.

Correspondingly, the terminal device receives the resource allocation information.

By implementing the above embodiment, the terminal device sends the message carrying the terminal type to the network device, establishes the association relationship between the terminal type and the device identity of the terminal device, and saves the association relationship, and the network device, when performing resource allocation on the terminal device, obtains the terminal type of the terminal device according to the known device identity and association relationship, then obtains the resource allocation information of the terminal device according to the terminal type, and then sends the resource allocation information to the terminal device. Therefore, by implementing the embodiment of the present disclosure, the terminal device can actively report the terminal type to the network device, and then the network device, during resource allocation, can quickly find the terminal type of the terminal device on the basis of the established association relationship. The resource allocation is rationally performed on the terminal sending the RRC setup request message encapsulated with the terminal type to the network device includes:

when the terminal device accesses to the network, transmitting, by the terminal device, the terminal type to the RRC layer via the NAS, encapsulating, by the RRC layer, the terminal type into the RRC setup request message, and sending the RRC setup request message encapsulated with the terminal type to the network device via the physical layer.

It may be seen that the terminal device requests for establishment of an RRC link by sending the RRC setup request message, so it is simple and convenient to send the terminal type to the network device via the RRC setup request message.

The terminal type (ue-type) is encapsulated in the RRC setup request message in the following way:

```
RRCSetupRequest message
-- ASN1START
-- TAG-RRCSETUPREQUEST-START
RRCSetupRequest ::=          SEQUENCE {
    rrcSetupRequest          RRCSetupRequest-IEs
}
RRCSetupRequest-IEs ::=      SEQUENCE {
ue-Identity                  InitialUE-Identity,
establishmentCause           EstablishmentCause,
ue-type                      UE-TYPE,
spare                        BIT STRING (SIZE (1))
}
InitialUE-Identity ::=       CHOICE {
                             ng-5G-S-TMSI-Part1      BIT STRING (SIZE (39)),
                             random Value            BIT STRING (SIZE (39))
                             }
                             Establishmentcause ::=  ENUMERATED {
                                     Emergency, highPriorityAccess, mt-Access, mo-Signaling,
                                     mo-Data, mo-VoiceCall, mo-VideoCall, mo-SMS, mps-
Priority Access, mcs-Priority Access,
                                     spared, spared, spared, spare3, spare2, spare1},
                             UE-TYPE ::=             ENUMERATED {high-end-phone, low-end-phone,high-end-
wear, low-end-wear, industrial sensor, spare}
                             or UE-TYPE ::=          ENUMERATED {high-rate-ue, mid-rate-ue, low-rate-ue,
spare}
                                     -- TAG-RRCSETUPREQUEST-STOP
``` device according to the terminal type, thereby reducing the waste of network resources and improving the rationality of terminal services.

Figure 4:
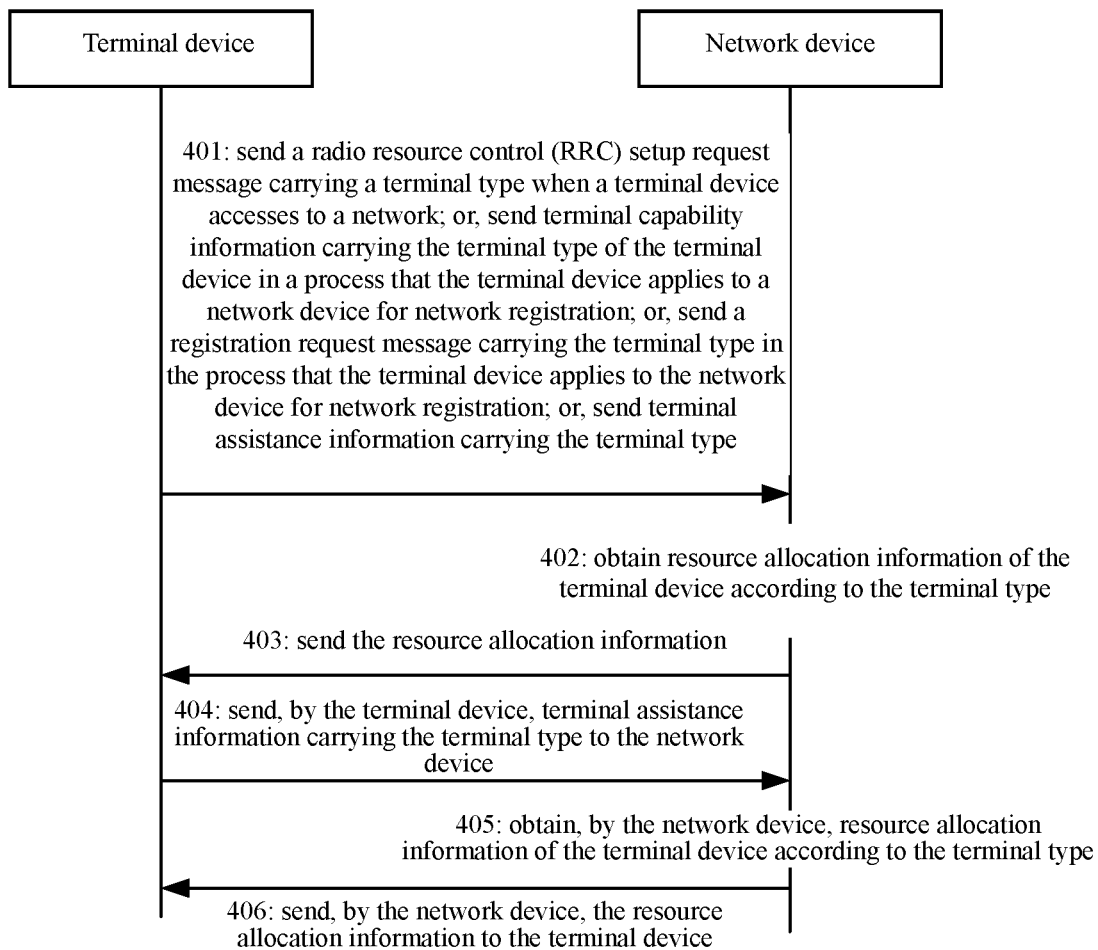
FIG. 4 is a signaling diagram of a resource allocation method disclosed by a third embodiment of the present disclosure.

Referring to FIG. 4, it is a signaling diagram of a resource allocation method disclosed by a third embodiment of the present disclosure. As shown in FIG. 4, the resource allocation method may include:

401: sending, by a terminal device, an RRC setup request message carrying a terminal type to a network device when the terminal device accesses to a network.

Correspondingly, the network device receives the RRC setup request message carrying the terminal type of the terminal device. After step 401 is performed, it proceeds to step 405.

Optionally, the sending, by a terminal device, an RRC setup request message carrying a terminal type to a network device when the terminal device accesses to a network includes:

when the terminal device accesses to the network, encapsulating, by the terminal device, the terminal type into the RRC setup request message, and then sending the RRC setup request message encapsulated with the terminal type to the network device.

Further optionally, the when the terminal device accesses to the network, encapsulating, by the terminal device, the terminal type into the RRC setup request message, and then

402: sending, by the terminal device, terminal capability information carrying the terminal type of the terminal device to the network device in a process that the terminal device applies to the network device for network registration.

Correspondingly, the network device receives the terminal capability information carrying the terminal type of the terminal device. After step 402 is performed, it proceeds to step 405.

Optionally, the terminal device sends the terminal capability information encapsulated with the terminal type to the network device in the process that the terminal device applies to the network device for network registration.

When the terminal device applies for network registration, the terminal capability information is informed to the network device, and it is simple and convenient to encapsulate the terminal type into the terminal capability information to be together sent to the network device.

403: sending, by the terminal device, a registration request message carrying the terminal type to the network device in the process that the terminal device applies to the network device for network registration.

Correspondingly, the network device receives the registration request message carrying the terminal type of the terminal device. After step 403 is performed, it proceeds to step 405.

Optionally, the sending, by the terminal device, a registration request message carrying the terminal type to the network device in the process that the terminal device applies to the network device for network registration includes:

The terminal device encapsulates the terminal type into the registration request message, and sends the registration request message encapsulated with the terminal type to the network device in the process that the terminal device applies to the network device for network registration.

When the terminal device applies to the network device for network registration, it is simple and convenient to encapsulate the terminal type into the registration request message to be sent together by sending the registration request message to the network device.

404: sending, by the terminal device, terminal assistance information carrying the terminal type to the network device.

Correspondingly, the network device receives the terminal assistance information carrying the terminal type of the terminal device. After step 404 is performed, it proceeds to step 405.

It may be understood that after the terminal device has established the RRC link with the network device, the terminal device sends the terminal assistance information to the network device, such that the network device can realize a corresponding function according to the terminal assistance information. If the terminal device needs to access the Internet, network quality measurement, cell switching, etc. are performed via the terminal assistance information.

Optionally, the sending, by the terminal device, terminal assistance information carrying the terminal type to the network device includes:

The terminal device encapsulates the terminal type into the terminal assistance information, and sends the terminal assistance information encapsulated with the terminal type to the network device.

It is simple and convenient to encapsulate the terminal type into the terminal assistance information to be sent together.

405: obtaining, by the network device, resource allocation information of the terminal device according to the terminal type.

It may be simple and convenient to send the terminal type to the network device in any one of ways in the above steps 401-404, and the network device performs resource allocation according to the received terminal type.

406: sending, by the network device, the resource allocation information to the terminal device.

Correspondingly, the terminal device receives the resource allocation information.

By implementing the above embodiment, the terminal device may send the terminal type to the network device via the RRC setup request message, the terminal capability information, the registration request message, or the terminal assistance information, and the network device, when performing resource allocation on the terminal device, may obtain the resource allocation information of the terminal device according to the terminal type, and then send the resource allocation information to the terminal device, such that the terminal device performs network configuration according to the resource allocation information. Therefore, by implementing the embodiment of the present disclosure, the terminal device can actively report the terminal type to the network device via the message in the existing protocol, and then the network device, during resource allocation, rationally performs resource allocation on the terminal device according to the terminal type, thereby reducing the waste of network resources and improving the rationality of terminal services.

Figure 5:
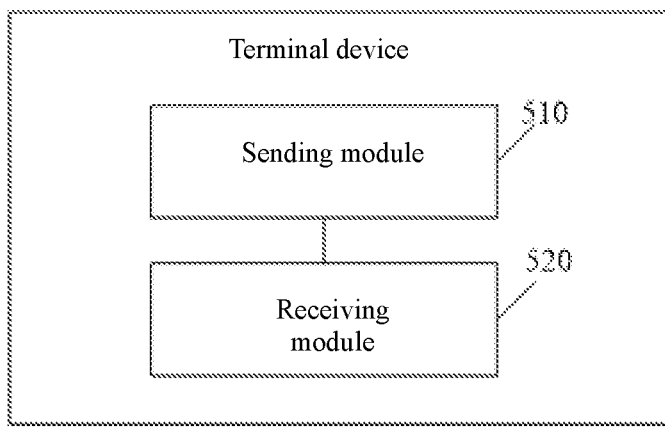
FIG. 5 is a schematic structural diagram of a terminal device disclosed by an embodiment of the present disclosure.

Referring to FIG. 5, it is a schematic structural diagram of a terminal device disclosed by an embodiment of the present disclosure. As shown in FIG. 5, the terminal device may include:

a sending module 510 configured to send a message carrying a terminal type of a terminal device to a network device; and a receiving module 520 configured to receive resource allocation information of the terminal device, sent by the network device, the resource allocation information being obtained by the network device according to the terminal type.

By implementing the above terminal device, the terminal type can be actively reported to the network device, such that the network device can perform rational resource allocation on the terminal device according to the terminal type, thereby reducing the waste of network resources and improving the rationality of terminal services.

Optionally, the message carrying the terminal type (Ue-type, hereinafter collectively referred to as the terminal type) of the terminal device refers to that the terminal type is encapsulated into the message, where the terminal type is encapsulated in the message by means of a cell structure. Payload content in the cell structure of the terminal type at least includes bits of a high-end phone, a low-end phone, a high-end wear, a low-end wear, and an industrial sensor, or the payload content in the cell structure of the above terminal type at least includes bits of a low-rate terminal (low-rate-ue), a mid-rate terminal (mid-rate-ue), and a high-rate terminal (high-rate-ue). The bits of the high-end phone may be filled with parameters to indicate whether the terminal device is the high-end phone, the bits of the low-end phone may be filled with parameters to indicate whether the terminal device is the low-end phone, the bits of the high-end wear may be filled with parameters to indicate whether the terminal device is the high-end wear, the bits of the low-end wear may be filled with parameters to indicate whether the terminal device is the low-end wear, and the bits of the industrial sensor may be filled with parameters to indicate whether the terminal device is the industrial sensor. Alternatively, the bits of the low-rate terminal (low-rate-ue) may be filled with parameters to indicate whether the terminal device is the low-rate terminal, the bits of the mid-rate terminal (mid-rate-ue) may be filled with parameters to indicate whether the terminal device is the mid-rate terminal, and the bits of the high-rate terminal (high-rate-ue) may be filled with parameters to indicate whether the terminal device is the high-rate terminal.

Optionally, the above sending module 510 is specifically configured to send an RRC setup request message carrying the terminal type of the terminal device to the network device when the terminal device accesses to a network;

or, to send terminal capability information carrying the terminal type of the terminal device to the network device in a process that the terminal device applies to the network device for network registration;

or, to send a registration request message carrying the terminal type of the terminal device to the network device in the process that the terminal device applies to the network device for network registration;

or, to send terminal assistance information carrying the terminal type of the terminal device to the network device.

Further, as an optional embodiment, the above sending module 510 is specifically configured to, when the terminal device accesses to the network, encapsulate the terminal type into the RRC setup request message, and then send the RRC setup request message encapsulated with the terminal type to the network device.

Further, the process that the above sending module 510 is configured to, when the terminal device accesses to the network, encapsulate the terminal type into the RRC setup request message, and then send the RRC setup request message encapsulated with the terminal type to the network device specifically includes:

when the terminal device accesses to the network, transmitting, by the terminal device, the terminal type to the RRC layer via the NAS, encapsulating, by the RRC layer, the terminal type into the RRC setup request message, and sending the RRC setup request message encapsulated with the terminal type to the network device via the physical layer.

It may be seen that the terminal device requests for establishment of an RRC link by sending the RRC setup request message, so it is simple and convenient to send the terminal type to the network device via the RRC setup request message.

Further, as another optional embodiment, the above sending module 510 is specifically configured to encapsulate the terminal type into the terminal capability information and to send the terminal capability information encapsulated with the terminal type to the network device in the process that the terminal device applies to the network device for network registration. When the terminal device applies for network registration, the terminal capability information is informed to the network device, and it is simple and convenient to encapsulate the terminal type into the terminal capability information to be together sent to the network device.

Further, as another optional embodiment, the above sending module 510 is specifically configured to encapsulate the terminal type into the registration request message and to send the registration request message encapsulated with the terminal type to the network device in the process that the terminal device applies to the network device for network registration. When the terminal device applies to the network device for network registration, it is simple and convenient to encapsulate the terminal type into the registration request message to be sent together by sending the registration request message to the network device.

Further, as another optional embodiment, the above sending module 510 is specifically configured to encapsulate the terminal type into the terminal assistance information and to send the terminal assistance information encapsulated with the terminal type to the network device. It is simple and convenient to encapsulate the terminal type into the terminal assistance information to be sent together.

Figure 6:
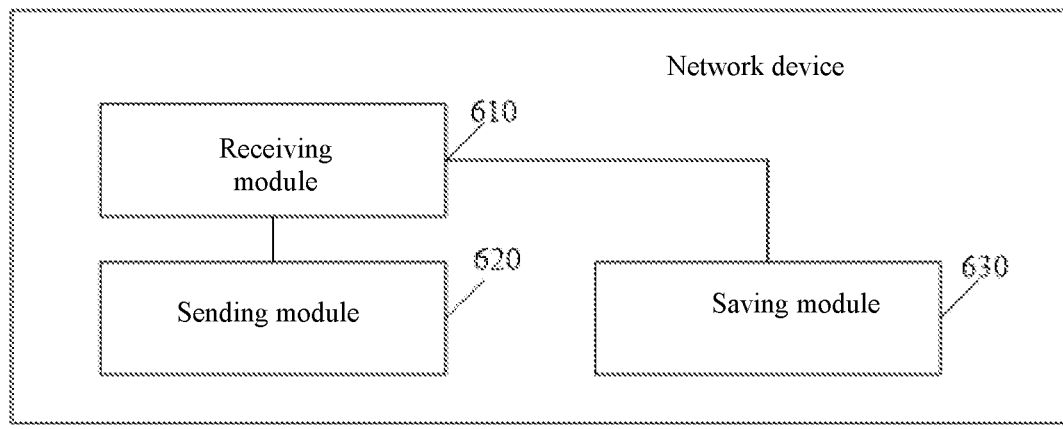
FIG. 6 is a schematic structural diagram of a network device disclosed by an embodiment of the present disclosure.

Referring to FIG. 6, it is a schematic structural diagram of a network device disclosed by an embodiment of the present disclosure. As shown in FIG. 6, the network device may include:

a receiving module 610 configured to receive a message carrying a terminal type of a terminal device, sent by the terminal device; and a sending module 620 configured to obtain resource allocation information of the terminal device according to the terminal type and to send the resource allocation information to the terminal device.

Optionally, the process that the receiving module 610 is configured to receive a message carrying a terminal type of a terminal device, sent by the terminal device, specifically includes:

receiving an RRC setup request message carrying the terminal type of the terminal device, sent by the terminal device, when the terminal device accesses to a network;

or, sending terminal capability information carrying the terminal type of the terminal device to the network device in a process that the terminal device applies to the network device for network registration;

or, sending a registration request message carrying the terminal type of the terminal device to the network device in the process that the terminal device applies to the network device for network registration;

or, receiving terminal assistance information carrying the terminal type of the terminal device, sent by the network device.

Further referring to FIG. 6, the network device further includes a saving module 630, where the saving module 630 is configured to establish an association relationship between the terminal type and a device identity of the terminal device and to save the association relationship after the above receiving module 610 receives the message carrying the terminal type of the terminal device, sent by the terminal device.

Further, the process that a sending module 620 is configured to obtain resource allocation information of the terminal device according to the terminal type specifically includes:

searching for a target terminal identity corresponding to the terminal type according to the association relationship, and obtaining the resource allocation information of the terminal device corresponding to the target terminal identity according to the terminal type.

By implementing the above network device, rational resource allocation can be performed according to the terminal type actively reported by the terminal device, thereby reducing the waste of network resources and improving the rationality of terminal services.

Figure 7:
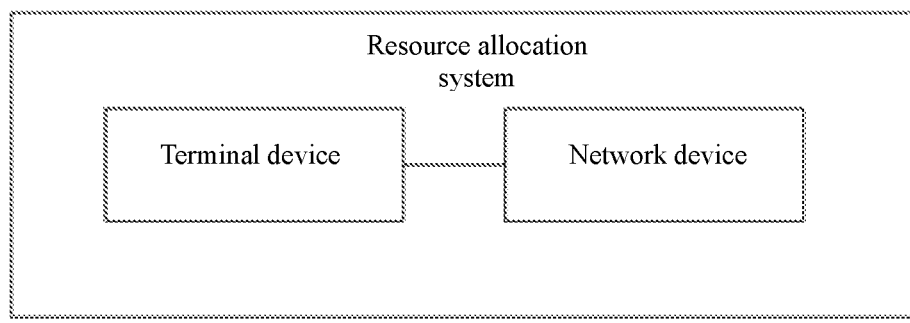
FIG. 7 is a schematic structural diagram of a resource allocation system disclosed by an embodiment of the present disclosure.

Referring to FIG. 7, it is a schematic structural diagram of a resource allocation system disclosed by an embodiment of the present disclosure. As shown in FIG. 7, the resource allocation system may include: a terminal device and a network device.

The terminal device of the system is specifically the terminal device described in the above embodiments, and the network device of the system is specifically the network device described in the above embodiments. More descriptions of the terminal device and the network device may refer to the above embodiments, which will not be repeated here.

An embodiment of the present disclosure further provides an electronic device, which may include:

a memory having executable program codes stored thereon; and a processor coupled to the memory;

where the processor is configured to call the executable program codes stored in the memory to perform the resource allocation method in the embodiments of the methods described above.

Figure 8:
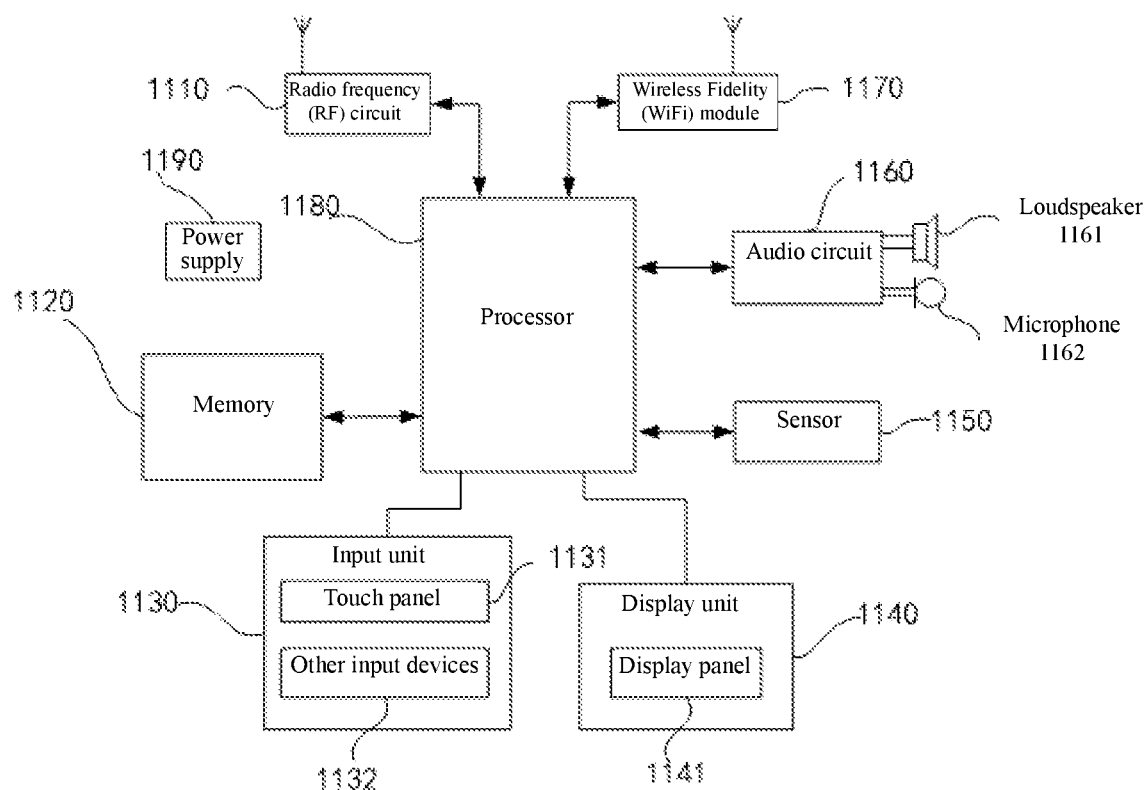
FIG. 8 is a schematic structural diagram of a phone disclosed by an embodiment of the present disclosure.

Referring to FIG. 8, the terminal device in the embodiment of the present disclosure may be a mobile phone as shown in FIG. 8. The mobile phone may include: a radio frequency (RF) circuit 1110, a memory 1120, an input unit 1130, a display unit 1140, a sensor 1150, an audio circuit 1160, a wireless fidelity (WiFi) module 1170, a processor 1180, a power supply 1190, and other components. The radio frequency circuit 1110 includes a receiver 1111 and a transmitter 1112. Those skilled in the art may understand that the structure of the mobile phone shown in FIG. 8 does not constitute a limitation to the mobile phone, and may include more or fewer components than shown in the figure, or combination of some components, or different component arrangements.

The RF circuit 1110 may be configured to receive and send a signal during information receiving and transmitting or conversation. In particular, downlink information of the node B is received and sent to the processor 1180 for processing. In addition, design uplink data is sent to the node B. In general, the RF circuit 1110 includes but is not limited to an antenna, at least one amplifier, a transceiver, a coupler, a low noise amplifier (LNA), a duplexer, etc. In addition, the RF circuit 1110 may also communicate with the network and other devices via radio communication. The above radio communication may use any communication standard or protocol, including but not limited to a global system of mobile communication (GSM), a general packet radio service (GPRS), code division multiple access (CDMA), wideband code division multiple access (WCDMA), long term evolution (LTE), an e-mail, a short messaging service (SMS), etc.

The memory 1120 may be configured to store software programs and modules. The processor 1180 may execute various functional applications and data processing of the mobile phone by running the software programs and the modules stored in the memory 1120. The memory 1120 may mainly include a program storage region and a data storage region, where the program storage region may store an operating system, an application program required for at least one function (such as a sound play function and an image play function), etc.; and the data storage region may store data (such as audio data and a phone book), etc. created according to the use of the mobile phone. In addition, the memory 1120 may include a high speed random access memory, and may also include a non-volatile memory, such as at least one disk memory, a flash memory, or other volatile solid-state memories.

The input unit 1130 may be configured to receive input digital or character information and to generate key signal inputs related to user settings and function control of the mobile phone. Specifically, the input unit 1130 may include a touch panel 1131 and other input devices 1132. The touch panel 1131, also referred to as a touch screen, may collect user's touch operation (such as user's operation on or near the touch panel 1131 with any suitable object or accessory such as a finger and a touch pen) on or near the touch panel, and drive a corresponding connection device according to a preset program. Optionally, the touch panel 1131 may include two parts of a touch detection device and a touch controller. The touch detection device detects a touch orientation of a user, detects a signal generated by touch operation, and transmits the signal to the touch controller; and the touch controller receives touch information from the touch detection device, converts the touch information into touch point coordinates, then sends the touch point coordinates to the processor 1180, and can receive commands transmitted from the processor 1180 and execute the commands. In addition, the touch panel 1131 may be realized by means of various types such as resistors, capacitors, infrared rays, and surface acoustic waves. In addition to the touch panel 1131, the input unit 1130 may also include other input devices 1132. Specifically, other input devices 1132 may include, but are not limited to, one or more of a physical keyboard, function keys (such as a volume control key and a switch key), a trackball, a mouse, a joystick, etc.

The display unit 1140 may be configured to display information input by the user or information provided to the user and various menus of the mobile phone. The display unit 1140 may include a display panel 1141. Optionally, the display panel 1141 may be configured in the form of a liquid crystal display (LCD), an organic light-emitting diode (OLED), etc. Further, the touch panel 1131 may cover the display panel 1141. When the touch panel 1131 detects the touch operation on or near the touch panel, the touch operation is transmitted to the processor 1180 to determine the type of a touch event, and then the processor 1180 provides a corresponding visual output on the display panel 1141 according to the type of the touch event. Although in FIG. 8, the touch panel 1131 and the display panel 1141 serve as two independent components to realize input and output functions of the mobile phone, but in some embodiments, the touch panel 1131 may be integrated with the display panel 1141 to realize the input and output functions of the mobile phone.

The mobile phone may also include at least one sensor 1150, such as a light sensor, a motion sensor, and other sensors. Specifically, the light sensor may include an ambient light sensor and a proximity sensor, where the ambient light sensor may adjust the brightness of the display panel 1141 according to the brightness of ambient light, and the proximity sensor may turn off the display panel 1141 and/or backlight when the mobile phone moves to the ear. As one of motion sensors, an accelerometer sensor may detect the magnitudes of accelerations in all directions (generally three axes), may detect the magnitude and direction of gravity when stationary, and may be configured to recognize mobile phone attitude applications (such as horizontal and vertical screen switching, related games, and magnetometer attitude calibration), vibration recognition related functions (such as a pedometer and knocking), etc.; and as for a gyroscope, a barometer, a hygrometer, a thermometer, an infrared sensor, and other sensors that may also be configured on the mobile phone, they will not be repeated here.

The audio circuit 1160, a loudspeaker 1161, and a microphone 1162 may provide an audio interface between the user and the mobile phone. The audio circuit 1160 may transmit an electrical signal obtained by converting received audio data to the loudspeaker 1161, and the loudspeaker 1161 converts the electrical signal into a sound signal and outputs the sound signal. In another aspect, the microphone 1162 converts the collected sound signal into the electrical signal, the audio circuit 1160 receives the electrical signal and then converts the electrical signal into the audio data, the audio data is output to the processor 1180 for processing, the processed audio data is sent to another mobile phone via the RF circuit 1110, or the processed audio data is output to the memory 1120 for further processing.

WiFi belongs to a short-range wireless transmission technology. The mobile phone may help the user to receive and send e-mails, browse web pages, and access streaming media via the WiFi module 1170. It provides the user with wireless wideband Internet access. Although FIG. 8 shows the WiFi module 1170, it may be understood that the WiFi module does not belong to the necessary component of the mobile phone and completely may be omitted as needed within the scope of not changing the essence of the disclosure.

The processor 1180 is a control center of the mobile phone. It connects various parts of the entire mobile phone by means of various interfaces and circuits. It executes various functions and processing data of the mobile phone by running or executing the software programs and/or the modules stored in the memory 1120 and calling the data stored in the memory 1120, to monitor the entire mobile phone. Optionally, the processor 1180 may include one or more processing units. Preferably, the processor 1180 may integrate an application processor and a modem processor, where the application processor mainly processes the operating system, user interfaces, and application programs, and the modem processor mainly processes radio communication. It may be understood that the above modem processor may also not be integrated into the processor 1180.

The mobile phone further includes the power supply 1190 (such as a battery) that supplies power to various components. Preferably, the power supply may be logically connected to the processor 1180 via a power management system, such that the functions such as charging, discharging, and power consumption can be managed via the power management system. Although not shown, the mobile phone may further include a camera, a Bluetooth module, etc., which will not be repeated here.

In some embodiments, the above circuit 1110 may receive the resource configuration information sent by the network device.

An embodiment of the present disclosure further discloses a computer-readable storage medium having a computer program stored thereon, where the computer program causes a computer to perform a resource allocation method disclosed in FIG. 2 to FIG. 4.

An embodiment of the present disclosure further discloses a computer program product that, when run on a computer, causes the computer to perform part or all of steps in any one method disclosed in FIG. 2 to FIG. 4.

An embodiment of the present disclosure further discloses an application publishing platform configured to publish a computer program product that, when run on a computer, causes the computer to perform part or all of steps in any one method disclosed in FIG. 2 to FIG. 4.

Those of ordinary skill in the art may understand that all or part of steps in various methods according to the above embodiments may be completed by instructing relevant hardware via a program. The program may be stored in a computer-readable storage medium. The storage medium includes a read-only memory (ROM), a random access memory (RAM), a programmable read-only memory (PROM), an erasable programmable read only memory (EPROM), a one-time programmable read-only memory (OTPROM), an electrically-erasable programmable read-only memory (EEPROM), a compact disc read-only memory (CD-ROM) or other compact disc memories, a disk memory, a magnetic tape memory, or any other computer-readable media that may be configured to be carried or to store data.

The resource allocation method and a system, the terminal device, and the network device disclosed by the embodiments of the present disclosure are described in detail above. The principle and embodiments of the present disclosure are illustrated by applying the specific examples herein. The description of the above embodiments is only intended to help understand the method and a core idea in the present disclosure. Meanwhile, those of ordinary skill in the art may make changes in specific embodiment and scope of application according to the idea of the present disclosure. In conclusion, the content of this specification should not be construed as a limitation to the present disclosure.

What is claimed is:

1. A resource allocation method, comprising:
sending a message carrying a terminal type of a terminal device to a network device; and
receiving resource allocation information of the terminal device, sent by the network device, the resource allocation information being obtained by the network device according to the terminal type;
wherein the sending a message carrying a terminal type of a terminal device to a network device comprises:
sending a radio resource control (RRC) setup request message carrying the terminal type of the terminal device to the network device when the terminal device accesses to a network; or,
sending terminal capability information carrying the terminal type of the terminal device to the network device in a process that the terminal device applies to the network device for network registration; or,
sending a registration request message carrying the terminal type of the terminal device to the network device in the process that the terminal device applies to the network device for network registration; or,
sending terminal assistance information carrying the terminal type of the terminal device to the network device.

2. The method according to claim 1, wherein content in a cell structure of the terminal type comprises bits of a high-end phone, a low-end phone, a high-end wear, a low-end wear, and an industrial sensor, or the content in the cell structure of the terminal type comprises bits of a low-rate terminal, a mid-rate terminal, and a high-rate terminal.

3. A resource allocation method, comprising:
receiving a message carrying a terminal type of a terminal device, sent by the terminal device;
obtaining resource allocation information of the terminal device according to the terminal type; and
sending the resource allocation information to the terminal device;
wherein the receiving a message carrying a terminal type of a terminal device, sent by the terminal device, comprises:
receiving an RRC setup request message carrying the terminal type of the terminal device, sent by the terminal device, when the terminal device accesses to a network; or,
receiving terminal capability information carrying the terminal type of the terminal device, sent by the network device, in a process that the terminal device applies to the network device for network registration; or,
receiving a registration request message carrying the terminal type of the terminal device, sent by the network device, in the process that the terminal device applies to the network device for network registration; or,
receiving terminal assistance information carrying the terminal type of the terminal device, sent by the network device.

4. The method according to claim 3, wherein content in a cell structure of the terminal type comprises bits of a high-end phone, a low-end phone, a high-end wear, a low-end wear, and an industrial sensor, or the content in the cell structure of the terminal type comprises bits of a low-rate terminal, a mid-rate terminal, and a high-rate terminal.

5. The method according to claim 1 wherein after the receiving a message carrying a terminal type of a terminal device, sent by the terminal device, the method further comprises:
- establishing an association relationship between the terminal type and a device identity of the terminal device, and saving the association relationship;
- the obtaining resource allocation information of the terminal device according to the terminal type comprises:
- searching for a target terminal identity corresponding to the terminal type according to the association relationship, and obtaining the resource allocation information of the terminal device corresponding to the target terminal identity according to the terminal type.

6. An electronic device, comprising:
- a memory having executable program codes stored thereon; and
- a processor coupled to the memory;
- wherein the processor is configured to call the executable program codes stored in the memory to perform the following steps:
- sending a message carrying a terminal type of a terminal device to a network device; and
- receiving resource allocation information of the terminal device, sent by the network device, the resource allocation information being obtained by the network device according to the terminal type;
- wherein the sending a message carrying a terminal type of a terminal device to a network device comprises:
- sending an RRC setup request message carrying the terminal type of the terminal device to the network device when the terminal device accesses to a network; or,
- sending terminal capability information carrying the terminal type of the terminal device to the network device in a process that the terminal device applies to the network device for network registration; or,
- sending a registration request message carrying the terminal type of the terminal device to the network device in the process that the terminal device applies to the network device for network registration; or,
- sending terminal assistance information carrying the terminal type of the terminal device to the network device.

7. The electronic device according to claim 6, wherein content in a cell structure of the electronic device comprises bits of a high-end phone, a low-end phone, a high-end wear, a low-end wear, and an industrial sensor, or the content in the cell structure of the terminal type comprises bits of a low-rate terminal, a mid-rate terminal, and a high-rate terminal.

8. The electronic device according to claim 6, wherein the network device is in signaling connection with the electronic device;
- the network device receives the message carrying the terminal type of the terminal device, sent by the terminal device;
- the network device obtains the resource allocation information of the terminal device according to the terminal type; and
- the network device sends the resource allocation information to the terminal device.

9. The electronic device according to claim 8, wherein the process that the network device in signaling connection with the electronic device receives the message carrying the terminal type of the terminal device, sent by the terminal device, comprises:
- receiving an RRC setup request message carrying the terminal type of the terminal device, sent by the terminal device, when the terminal device accesses to a network; or,
- receiving terminal capability information carrying the terminal type of the terminal device, sent by the network device, in a process that the terminal device applies to the network device for network registration; or,
- receiving a registration request message carrying the terminal type of the terminal device, sent by the network device, in the process that the terminal device applies to the network device for network registration; or,
- receiving terminal assistance information carrying the terminal type of the terminal device, sent by the network device.

10. The electronic device according to claim 8, wherein the process that the network device in signaling connection with the electronic device receives the message carrying the terminal type of the terminal device, sent by the terminal device, comprises:
- receiving an RRC setup request message carrying the terminal type of the terminal device, sent by the terminal device, when the terminal device accesses to a network; or,
- receiving terminal capability information carrying the terminal type of the terminal device, sent by the network device, in a process that the terminal device applies to the network device for network registration; or,
- receiving a registration request message carrying the terminal type of the terminal device, sent by the network device, in the process that the terminal device applies to the network device for network registration; or,
- receiving terminal assistance information carrying the terminal type of the terminal device, sent by the network device.

11. The electronic device according to claim 8, wherein after the receiving a message carrying a terminal type of a terminal device, sent by the terminal device, the method further comprises:
- establishing, by the network device, an association relationship between the terminal type and a device identity of the terminal device, and saving the association relationship;
- the obtaining resource allocation information of the terminal device according to the terminal type comprises:
- searching for, by the network device, a target terminal identity corresponding to the terminal type according to the association relationship, and obtaining the resource allocation information of the terminal device corresponding to the target terminal identity according to the terminal type.

* * * * *